Nov. 5, 1940.                P. SIBLEY                 2,220,294
                       FLOAT VALVE MECHANISM
                        Filed July 21, 1938

Inventor:
Paul Sibley
by Owen N. Kennedy
     Attorney

Patented Nov. 5, 1940

2,220,294

UNITED STATES PATENT OFFICE 2,220,294

FLOAT VALVE MECHANISM

Paul Sibley, Worcester, Mass., assignor to Worcester Taper Pin Company, Worcester, Mass., a corporation of Massachusetts Application July 21, 1938, Serial No. 220,567

6 Claims. (Cl. 137—68)

The present invention relates to a float valve mechanism, particularly adapted for use in controlling the flow of liquid fuel to oil burners, internal combustion engines, or in any connection where a continuous flow of liquid is required, in predetermined quantity.

The object of the invention is to provide a float valve mechanism of the character indicated, that will normally function to maintain a predetermined and substantially constant liquid level in the float chamber. In addition, the valve mechanism will automatically function to shut off the flow of liquid from the supply to the float chamber, upon the occurrence of any abnormal condition which interferes with normal operation of the valve and would otherwise cause overflowing of the liquid, to create a fire hazard, as with liquid fuel. The above and other advantageous features of the invention will hereinafter appear from the following description considered in connection with the accompanying drawing, in which:

Figure 1:
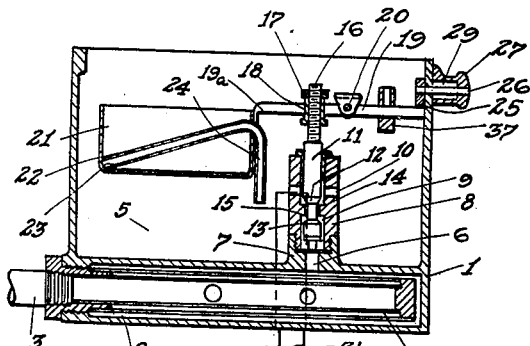
Fig. 1 is a vertical sectional view of a valve mechanism embodying the invention.

Referring first to Fig. 1, the valve mechanism consists of a casing 1, having a passage 2, at one end of which is received an inlet pipe 3 connected to a suitable supply of liquid fuel, not shown. A suitable strainer 4 is located within the passage 2, and liquid fuel passing through the strainer 4 from the inlet pipe 3 is admitted to an open float chamber 5 through a port 6 extending through the bottom of the chamber 5. The inlet port 6 to the float chamber 5 is surrounded by a flange 7, internally threaded to receive a valve sleeve 8. The sleeve 8 provides a central, longitudinally extending passage 9, in communication with the port 6, and radial openings 10 extending from the passage 9 permit the flow of liquid fuel into the float chamber 5.

Figure 6:
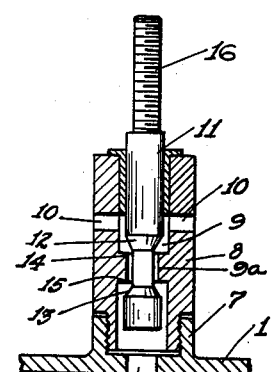
Fig. 6 is a fragmentary view of the valve passage, on an enlarged scale.

For the purpose of controlling the flow of fuel through the valve sleeve passage 9 and openings 10, a valve member 11 is longitudinally movable within the sleeve 8. The valve member 11 provides spaced conical portions 12 and 13, facing oppositely with respect to seats 14 and 15, provided by a contracted portion 9a of the sleeve passage 9. In the position of the mechanism shown in Fig. 6, both valve portions 12 and 13 are out of engagement with their respective seats 14 and 15, although it is obvious that upward or downward movement of the valve 11 will cause closure of the valve passage 9.

The valve member 11 provides a spindle 16, threaded at its upper portion to receive a nut 17, providing a groove 18 engaged by the spaced arms 19a of a lever 19 mounted on a pivot 20. The free end of the lever 19 beyond the spindle nut 17, carries a float 21, in the form of a cup open at its top. The float 21 provides a siphon tube 22, extending through one wall, with an opening 23 at one end of the tube 22 located just above the bottom of the float 21. The tube 22 also provides an extension 24 extending downwardly below the float, and the purpose and function of the siphon tube 22 will be hereinafter described.

Figure 2:
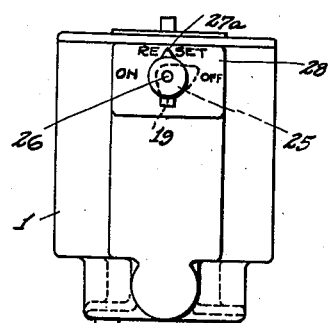
Fig. 2 is an end elevation of the parts of Fig. 1, as viewed from the right.

The float lever 19 extends on the opposite side of the pivot 20 from the float 21, and terminates beneath a cam 25 mounted on a pin 26 turnable with a knob 27. As best shown in Fig. 2, the knob 27 provides an indicator 27a, cooperating with markings on a dial 28, and when the indicator 27a is at the "reset" position, the cam 25 holds the end of the float lever 19 in the position of Fig. 1, in which both valve portions 12 and 13 are out of engagement with the corresponding valve seats 14 and 15, respectively.

Assuming that the float chamber 5 is empty to start with, and it is desired to set the apparatus in operation, the knob 27 is first turned to the "reset" position, in which the cam 25 moves the float 21 to the position of Fig. 1. Liquid fuel thereupon enters the passage 2 from the inlet 3, and flows upwardly through the port 6, the then open valve passage 9 and side openings 10, into the chamber 5. As the fuel rises in the chamber 5, the float becomes buoyant and starts to rise, thereby turning the lever 19 about its pivot 20 and imparting upward movement to the valve 11, in the direction of fuel flow in passage 9. When the fuel in the chamber 5 has reached a predetermined level, the lower valve surface 13 engages the seat 15 to shut off further flow of fuel into the chamber 5.

Figure 5:
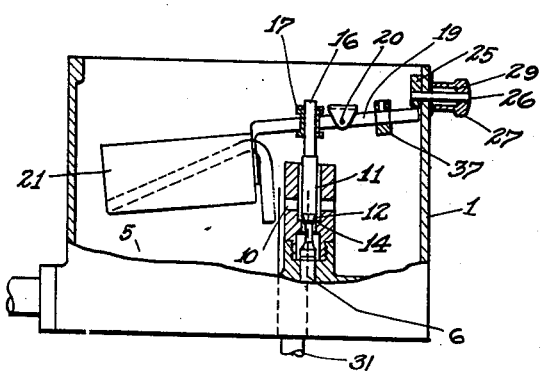
Fig. 5 is a vertical sectional view similar to Fig. 1, but showing the parts of the mechanism in a different position.

As the float 21 starts to rise, the opposite end of the lever 19 moves away from the cam 25, whereupon a spring 29, previously placed under compression by turning the knob 27 to the "reset" position, is then free to turn the knob to the "on" position shown in Fig. 2. One end of the spring 29 is fixed, while its other end is connected to the cam pin 26, so that the spring normally maintains the knob in the "on" position. With the knob 27 in the "on" position, it is to be noted that the cam 25 will then permit upward movement of the free end of the float lever, as indicated in Fig. 5.

Figure 3:
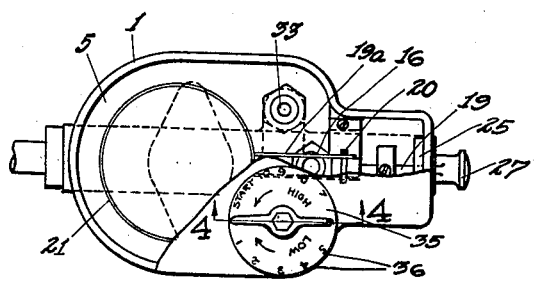
Fig. 3 is a plan view of the parts of Fig. 1, with a portion of the top of the float chamber shown.
Figure 4:
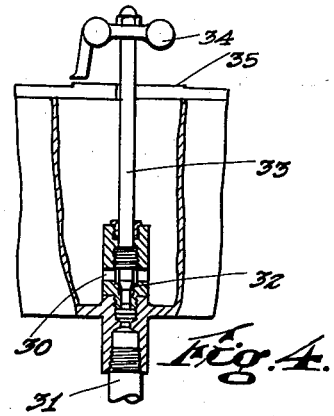
Fig. 4 is a fragmentary sectional view along the line 4—4 of Fig. 3.

With the fuel having reached the level at which it is shut off by engagement of the valve portion 13 with the seat 15, the fuel then flows out of the chamber 5 through one or more discharge openings 30, each in communication with an outlet pipe 31 leading to a burner, or other fuel consuming device. As best shown in Fig. 3, the discharge passages 30 are offset from the axis of the float valve 11, and each passage 30 has a metering valve 32 movable therein by means of a threaded spindle 33. Each valve spindle 33 provides a handle 34 cooperating with a dial 35 which, as shown in Fig. 3, provides markings 36 to indicate the rate of discharge of the fuel from the chamber 5 under the control of the valve 32.

As the fuel level in the float chamber 5 falls, due to consumption of the fuel, the lowering of the float 21 moves the valve spindle 16 downwardly to disengage the valve portion 13 from the seat 15, and thereby again admit fuel to the chamber 5. Therefore, during the normal operation of the valve mechanism, the float 21 continues to rise and fall, and so tends to maintain a constant level of fuel in the chamber 5. In order to vary the normal level of the fuel in the reservoir 5, the operating position of the float 21 can be adjusted by means of the threaded nut 17 on the valve stem 16. Furthermore, a counterweight 37 is adjustably mounted on the lever 19 on the opposite side of the pivot 20, with respect to the float 21, so that the float 21 can be partially balanced to obtain a condition of substantial equilibrium of the parts, in their normal operation.

As set forth above, the normal operation of the valve mechanism tends to maintain a constant level of fuel in the float chamber 5, due to the cooperation between the lower valve portion 13 and its seat 15. However, upon the occurrence of any abnormal condition, such as would prevent the valve passage 9 from being closed as the float rises, due to the presence of foreign matter, or upon failure of the float 21 to rise, as the fuel accumulates in the chamber 5, provision is made for automatically shutting off the further flow of fuel to the chamber 5.

Assuming that the lower valve surface 13 has failed to closely engage the seat 15 as the fuel rises in the chamber 5, continued rising of the fuel level will result in the fuel overflowing the lip of the open float 21. Therefore, the float will become filled with fuel, and immediately fall towards the bottom of the chamber 5 into the position of Fig. 5. In this position of the float 21, the upper valve surface 12 will press tightly against the upper seat 14, and thereby shut off any further flow of fuel into the chamber 5. In this way, flooding of the chamber 5 and overflow of the fuel to create a fire hazard, is automatically prevented, and obviously, a leak in the float 21 so as to render it no longer buoyant, will have the same effect as failure of the valve mechanism to function. Furthermore, should there be a break in the outlet pipe 31, the rapid draining of the chamber 5 will permit the float 21 to sink by its own weight and close off further flow of fuel to the chamber 5.

After the float 21 has moved downwardly to the position of Fig. 5, in which no further fuel is admitted to the chamber 5, continued outward flow of fuel through the pipe 31 to the consuming device will finally result in the chamber being emptied of fuel. As this occurs, the float 21 will be drained of fuel, or any other liquid, automatically by the action of the siphon tube 22. As previously pointed out, the end of the tube 22 inside the float 21, has an opening 23 at substantially the bottom of the float, whereas the tube extension 24 provides an opening well below the float bottom. Therefore, when the falling fuel level in the chamber exposes the lower end of the tube extension 24, downward flow of the fuel in the tube will result in a siphon effect, and the automatic draining of the float 21 in readiness for resuming normal operation of the valve mechanism.

In order to set the mechanism in operation again, with the parts occupying the position of Fig. 5, it is only necessary to turn the knob 27 to the "reset" position, previously referred to, thereby causing the cam 25 to turn the lever 19 about its pivot 20, into the position of Fig. 1. This raises the valve spindle 16, and moves the valve portion 12 out of engagement with the seat 14, to again admit fuel to the chamber 5. Assuming that the lower valve portion 13 and seat 15 are free of foreign matter when the knob 27 is turned, fuel will again enter the chamber 5, and the float 21 having been automatically drained by the siphon tube, will resume its function of controlling the admission of fuel to the chamber to maintain a substantially constant fuel level. Upon raising of the float to disengage the free end of the lever 19 from the cam 25, the spring 29 will return the knob 27 to the "on" position, where it will remain during normal functioning of the valve mechanism.

Should it be desired to manually shut off the flow of fuel into the chamber 5, the knob can be turned to the "off" position indicated in Fig. 2. When this occurs, a portion of the cam 25 still farther removed from the axis of the pin 26, will engage the end of the lever 19, and so tilt the float 21 to the position which it normally occupies when raised by the fuel in the chamber 5 to move the valve portion 13 against the seat 15. This shuts off any further flow of fuel to the chamber 5, and the parts will remain in this position until the knob 27 is turned to the "reset" position, in order to resume normal functioning of the mechanism.

From the foregoing, it is apparent that by the present invention there is provided an improved float valve mechanism that will normally function to maintain a substantially constant fuel level in the float chamber, and is adapted, upon the occurrence of any abnormal condition, to automatically shut off the flow of fuel from the supply to the float chamber. In the operation of the valve 11, it is to be noted that the valve portion 13 always closes in the direction of fuel flow through the passage 9. Therefore, in the normal functioning of the valve mechanism to maintain a constant fuel level in the chamber 5, the upward pressure of the fuel stream assists the natural buoyancy of the float 21 to insure that the flow of fuel will be cut off quickly, when the normal fuel level is obtained.

On the other hand, the downward movement of the valve portion 12, in response to falling of the float 21, upon the occurrence of an overflow, or break in the outlet pipe 31, is always against the direction of fuel flow in the valve passage 9. Therefore, the upper valve portion 12, which is depended upon to stop the fuel flow upon the occurrence of an emergency, is continuously subjected to the normal flow of fuel, so that dirt cannot readily lodge thereon. As a result, the valve portion 12 is always clean, and in condition to effect a positive closure of the fuel flow, upon being moved downwardly to engage its seat 14 by a falling float 21.

While for purposes of illustration, the mechanism is described in connection with the control of the flow of liquid fuel, obviously it will as readily control the flow of any other fluid medium. Furthermore, the siphon-operated means for automatically draining the open float, when it fills and sinks, will function just as effectively with the float connected to valve members of different construction from those shown in the drawing.

I claim:

1. In a float valve mechanism, a chamber providing an inlet passage, a valve movable axially of said passage, an open float pivotally mounted within said chamber and a connection between said float and said valve, whereby said float is operable to maintain a substantially constant liquid level in said chamber, said float in its normal operation being adapted to move said valve in said passage to open and close the same, with said float being adapted to overflow and sink to move said valve to its closed position, upon an increase of the liquid level in said chamber above normal, and means incorporated in said float and movable therewith, to automatically drain the same when said chamber becomes empty, following shutting off of the admission of liquid thereto.

2. In a float valve mechanism, a chamber providing an inlet passage, spaced valve seats provided in said passage, a valve movable axially of said passage and providing portions adapted to engage said seats in response to movement of said valve in opposite directions, an open float pivotally mounted within said chamber and a connection between said float and said valve, whereby said float is operable to maintain a substantially constant liquid level in said chamber, said float in its normal operation being adapted to move said valve in one direction through said passage to close the same, with said float being adapted to overflow and sink, upon an increase of the liquid level in said chamber above normal, to move said valve, in the opposite direction through said passage to close the same, and a siphon tube carried by said float, with an open end extending outside of and below the bottom of said float for automatically draining the float when the liquid in said chamber flows out to expose the open end of said siphon tube, following shutting off of said inlet passage by the sunken float.

3. In a float valve mechanism, the combination with a casing having an inlet passage in one wall thereof, spaced seats provided by said passage, a valve movable axially of the passage for engaging one or the other of said seats in accordance with the direction of movement of said valve, a float carried by an arm pivotally mounted in said casing, a connection between said float arm and said valve, with the weight of said float being sufficient to maintain said valve in engagement with one seat to close the passage when said casing is empty, and a shaft extending through a wall of the casing and turnable from outside, said shaft carrying a cam adapted to engage the float arm on the side of its pivot opposite to said valve connection to turn the arm and raise said valve to disengage both seats and permit the admission of liquid to said casing.

4. In a float valve mechanism, the combination with a casing having an inlet passage in one wall thereof, spaced seats provided by said passage, a valve movable axially of the passage for engaging one or the other of said seats in accordance with the direction of movement of said valve, a float carried by an arm pivotally mounted in said casing, a connection between said float arm and said valve, with the weight of said float being sufficient to maintain said valve in engagement with one seat to close the passage when said casing is empty, and a shaft turnable from outside the casing carrying a cam adapted to engage the float arm on the side of its pivot opposite to said valve connection to turn the arm and raise said valve into a position in which the other seat closes the valve passage.

5. In a liquid supply system, a chamber providing a passage for the admission of liquid, a valve in said passage, a hollow open float movable in said chamber, connected to said valve and operating normally in response to changes in the liquid level within said chamber to open or close said valve for maintaining a substantially constant predetermined liquid level in said chamber, said valve in its closed position limiting further upward movement of said float whereby any failure of said valve, when in its closed position, to shut off the admission of liquid to said chamber causes filling and sinking of said float by the liquid, valve means responsive to sinking of said filled float for closing said passage, and means incorporated in said float and movable therewith to automatically drain the same when said chamber becomes empty following the shutting off of the admission of liquid thereto by said second-named valve means.

6. In a liquid supply system, a chamber providing a passage for the admission of liquid, a valve in said passage, a hollow open float pivotally mounted in said chamber, connected to said valve and operating normally in response to changes in the liquid level within said chamber to open or close said valve for maintaining a substantially constant predetermined liquid level in said chamber, said valve in its closed position limiting further upward movement of said float whereby any failure of said valve when in its closed position to shut off the admission of liquid to said chamber causes filling and sinking of said float by the liquid, valve means responsive to sinking of said filled float for closing said passage, and a siphon tube carried by said float with an open end extending outside of and below the bottom of said float for automatically draining the float when the liquid in said chamber flows out to expose the open end of said siphon tube following shutting off of said inlet passage by the second-named valve means.

PAUL SIBLEY.